T. W. MEIKLEJOHN.
SERVICE TRUCK.
APPLICATION FILED SEPT. 25, 1918.
1,322,595.
Patented Nov. 25, 1919.
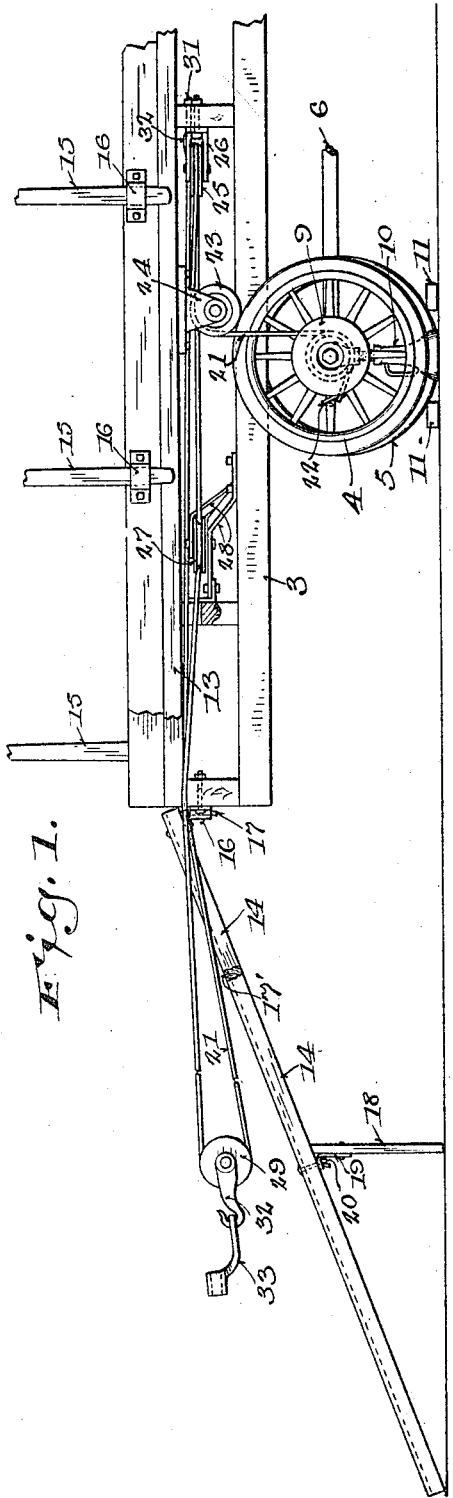
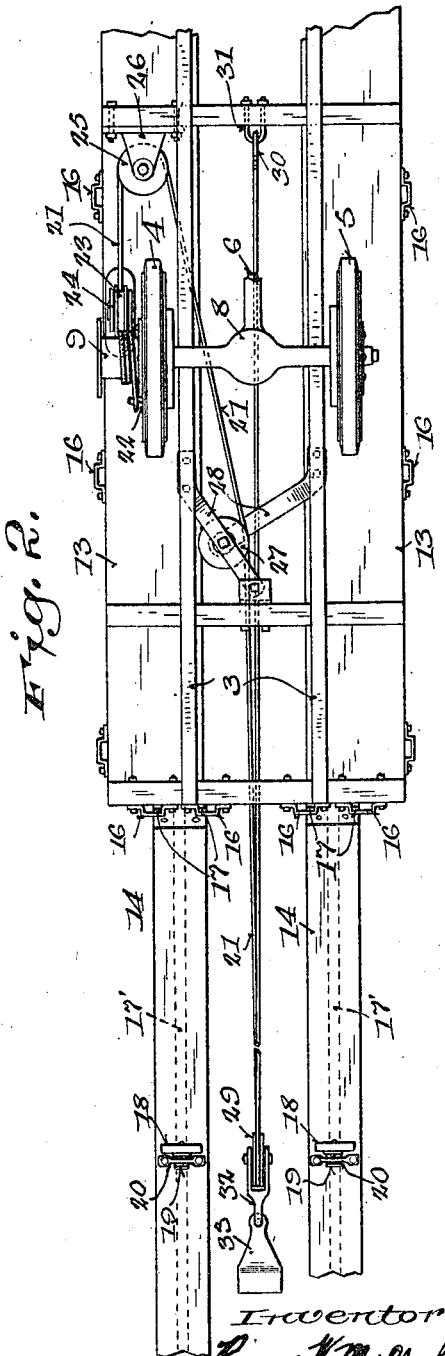

UNITED STATES PATENT OFFICE.

THOMAS W. MEIKLEJOHN, OF FOND DU LAC, WISCONSIN.

SERVICE-TRUCK.

1,322,595.   Specification of Letters Patent.   Patented Nov. 25, 1919.

Application filed September 25, 1918. Serial No. 255,653.

*To all whom it may concern:*

Be it known that I, THOMAS W. MEIKLE-JOHN, a citizen of the United States, and resident of Fond du Lac, in the county of Fond du Lac and State of Wisconsin, have invented new and useful Improvements in Service-Trucks, of which the following is a description, reference being had to the accompanying drawings, which are a part of this specification.

The invention relates to automobile trucks and more particularly to a truck provided with means for loading and unloading vehicles onto and from the truck. While the invention is primarily designed to provide a service truck for motor tractors so that in case the tractor is disabled and needs repairs necessitating its transportation to the repair shop it may be readily hauled up onto the service truck and carried to the shop, the service truck may also be used for transporting other vehicles and machinery or heavy freight.

The invention further consists in the several features hereinafter described.

In the drawings: Figure 1 is an elevation view of the device embodying the invention, parts being broken away and parts being shown in section; Fig. 2 is a bottom view of the truck, parts being broken away.

In the drawings, the numeral 3 designates the body of an automobile truck, 4 and 5 the rear wheels, 6 the drive shaft, 8 and the rear axle construction including the usual differential and the wheel drive shafts.

The rear wheel 4 is provided with a drum 9 bolted or otherwise suitably secured to said wheel so as to turn with it and when in use this wheel is raised by a jack 10 under the axle 8, and the wheel 5 is held against rotation in any suitable manner as by blocks 11, the differential gearing between the rear wheels and the drive shaft permitting the independent movement of either wheel, as will be readily understood.

The platform of the truck is composed of fixed planks 13 and removable planks 14. The truck is provided with the usual stakes 15 adapted to fit into the stake pockets 16 at the sides and rear end of truck body. The planks 14 carry hooks 17 at one of their ends which are adapted to fit into the pairs of spaced apart stake pockets 16 on the rear end of the truck body, and when so fixed the planks are inclined downwardly from the rear of the truck and serve as rails or skids, grooves 17' being provided in the upper faces of said planks to form tracks for the front wheels of the tractor or other vehicle where said wheels are provided with flanged tread portions as is the case with the Fordson tractor for which this service truck is particularly designed. When the planks 14 are used as skids they are braced intermediate their ends by means of uprights 18 provided with hooks 19 detachably engaging sockets 20 in the underside of said planks. When not employed as skids the planks 14 are replaced upon the truck body between the planks 13 to form the truck platform.

The drum 9 receives a cable 21 which is secured at one end by a hook 22 to one of the spokes of the wheel 4, passes around said drum and thence upwardly over a vertically disposed guide pulley 23 mounted in a bracket 24 secured to the underside of the truck platform, thence over a horizontally disposed guide pulley 25 mounted in a bracket 26 secured to the truck frame and thence over a horizontally disposed guide pulley 27 mounted in frame supports 28, and from this pulley the cable passes beyond the truck through a tackle block 29, and thence returns and is secured at its other end by a hook 30 to a staple or anchor 31 medially mounted in one of the truck frame members. The tackle block 29 is provided with a hook 32 engageable with a clevis 33 which is adapted to fit over the draw bar plate on the rear end of the tractor though it will be understood that this tackle block may be secured to the vehicle or load to be moved in any suitable manner.

With this construction, when it is desired to lift a vehicle, such as a tractor, onto the truck, the planks 14 are placed in inclined position as shown in the drawings, the clevis 33 secured to the tractor and the cable 21 paid out so that the block 29 may be secured to the clevis. The wheel 5 is blocked up and the wheel 4 lifted off the ground by the jack 10. Then on a forward drive of the shaft 6 the wheel 4 is turned and winds up one end of the cable onto the drum 9 which produces a pull on the clevis 33, as the other end of the cable is secured to the truck, with the result that the tractor is moved onto the skids 14 and run up on these skids onto the fixed planks 13 of the truck platform, the pulleys previously described serving to guide the cable and keep the tractor in the proper position during its upward movement on the skids 14. After the tractor has been hauled up onto the platform of the truck, the cable is unhitched from the tractor, unwound from the drum 9 and unhooked from the wheel 4. To lower the tractor from the vehicle the wheels 4 and 5 are held off the ground, the cable attached to the tractor and wound around the drum and the tractor moved down the skids, the cable being paid out from the drum and its speed being controlled by applying the usual brakes to the rear axles, the shaft 6 being disconnected from the engine during the unloading operation.

From the foregoing description it will be apparent that the device is of simple construction and well adapted for the purpose described.

What I claim as my invention is:

1. In a motor truck, the combination, with a truck body and one of the rear wheels, of a drum mounted on said wheel, a hauling cable mounted on said drum, hook means on the end of the cable adjacent said drum to detachably engage one of the spokes of said wheel, means on the truck body for guiding said cable, a truck platform including removable floor members adapted to form a continuous floor for said truck body when not in use, means for readily removably securing said floor members at the rear of the truck to form inclined tracks for moving a vehicle on to or off the truck, and foldable brace means for the floor members when the same are used as inclined tracks.

2. In a vehicle truck, the combination, with a truck body, a differential mechanism, and one of the rear wheels, of a drum fixed on said wheel and in axial alinement therewith, a vertical guide pulley mounted on the under side of said truck body and disposed above said drum, a horizontal guide pulley carried by said truck body forward of the vertical guide pulley, a central horizontal guide pulley carried centrally by the truck body rearwardly of said horizontal guide pulley, a flexible cable engaged with said drum and having its adjacent end detachably secured to one of the spokes of said wheel, said cable passing upwardly over said vertical guide pulley then forwardly and around the horizontal guide pulley and then rearwardly toward the center of the truck and engaging the central horizontal guide pulley, a tackle block carried by said cable rearwardly of the last mentioned guide pulley, said cable being passed forwardly after engagement with the tackle block, means securing the end of said cable remote from the drum centrally to the truck body near the forward end thereof, removable floor members for said truck body and adapted to be disposed rearwardly from the rear end of said truck body to provide an inclined gangway, means detachably securing said floor members to the rear end of said truck body, and brace means for the intermediate portion of said gangway, said tackle block being adapted to be detachably engaged with a vehicle to move the same on to or off the truck body.

In testimony whereof, I affix my signature.

THOMAS W. MEIKLEJOHN.